US012643227B2

(12) United States Patent  
Nakamura

(10) Patent No.: US 12,643,227 B2  
(45) Date of Patent: Jun. 2, 2026

(54) NUMERICAL CONTROL SYSTEM

(71) Applicant: FANUC CORPORATION, Yamanashi (JP)

(72) Inventor: Ryou Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 267 days.

(21) Appl. No.: 18/003,251

(22) PCT Filed: Jun. 28, 2021

(86) PCT No.: PCT/JP2021/024346  
§ 371 (c)(1),  
(2) Date: Dec. 23, 2022

(87) PCT Pub. No.: WO2022/004651  
PCT Pub. Date: Jan. 6, 2022

(65) Prior Publication Data  
US 2023/0249337 A1 Aug. 10, 2023

(30) Foreign Application Priority Data

Jun. 30, 2020 (JP) ................................. 2020-113288

(51) Int. Cl.  
*B25J 9/16* (2006.01)  
*B25J 9/00* (2006.01)  
*G05B 19/4155* (2006.01)

(52) U.S. Cl.  
CPC ........ *B25J 9/1602* (2013.01); *G05B 19/4155* (2013.01); *B25J 9/00* (2013.01); *G05B 2219/50391* (2013.01)

(58) Field of Classification Search  
CPC ....... B25J 9/1602; B25J 9/00; G05B 19/4155; G05B 2219/50391  
See application file for complete search history.

(56) References Cited

U.S. PATENT DOCUMENTS

2005/0080515 A1 4/2005 Watanabe et al.  
2009/0112362 A1 4/2009 Nishi et al.  
(Continued)

FOREIGN PATENT DOCUMENTS

CN 102581849 A 7/2012  
CN 104457566 A 3/2015  
(Continued)

OTHER PUBLICATIONS

International Search Report issued in PCT/JP2021/024346; mailed Sep. 14, 2021.  
(Continued)

*Primary Examiner* — Jay Khandpur  
(74) *Attorney, Agent, or Firm* — Studebaker Brackett PLLC

(57) ABSTRACT

This numerical control system 1 comprises: a numerical control device 5 that generates a machine-tool command signal, which is a command to a machine tool 2, in accordance with a machine-tool numerical control program, and generates a robot command signal, which is a command to a robot 3, in accordance with a robot numerical control program described on the basis of a robot coordinate system; and a robot control device 6 that controls an operation of the robot 3 on the basis of the robot command signal. The robot control device 6 acquires a coordinate value of the robot 3 in the robot coordinate system, and transmits the coordinate value as a reference coordinate value to the numerical control device 5. The numerical control device 5 generates the robot command signal on the basis of the reference coordinate value transmitted from the robot control device 6 and the robot numerical control program.

4 Claims, 7 Drawing Sheets

(56)                    References Cited

U.S. PATENT DOCUMENTS

| | | | |
|---|---|---|---|
| 2017/0144300 A1 | 5/2017 | Oumi | |
| 2018/0164782 A1 | 6/2018 | Koga et al. | |
| 2019/0079500 A1* | 3/2019 | Nakano | G05B 19/41835 |
| 2019/0126480 A1 | 5/2019 | Imanishi | |
| 2020/0164512 A1* | 5/2020 | Ooba | G05B 19/4086 |
| 2021/0107137 A1* | 4/2021 | Ohige | B25J 9/1669 |
| 2022/0011754 A1* | 1/2022 | Sagasaki | B25J 9/1658 |
| 2023/0251630 A1* | 8/2023 | Nakamura | G05B 19/4155 |
| | | | 700/245 |

FOREIGN PATENT DOCUMENTS

| | | | | |
|---|---|---|---|---|
| CN | 105643369 A | | 6/2016 | |
| JP | 2004237441 A | * | 8/2004 | |
| JP | 3568173 B2 | * | 9/2004 | |
| JP | 2008077352 A | * | 4/2008 | |
| JP | 2019-053459 A | | 4/2019 | |
| JP | 2019-057262 A | | 4/2019 | |
| JP | 6647472 B1 | | 2/2020 | |
| WO | 84/03959 A1 | | 10/1984 | |

OTHER PUBLICATIONS

An Office Action mailed by the United States Patent and Trademark Office on Sep. 16, 2024, which corresponds to U.S. Appl. No. 18/003,260 and is related to U.S. Appl. No. 18/003,251.
International Search Report mailed Sep. 14, 2021 in the International Application No. PCT/JP2021/024340.

* cited by examiner

NUMERICAL CONTROL SYSTEM

TECHNICAL FIELD

The present disclosure relates to a numerical control system.

BACKGROUND ART

Generally, a numerical control program for controlling a machine tool and a robot program for controlling a robot are written in different programming languages. For this reason, an operator needs to familiarize himself/herself with both the numerical control program and the robot program in order to be able to operate a machine tool and a robot in parallel.

Patent Document 1 discloses a numerical control device that controls both a machine tool and a robot by a numerical control program. The numerical control device of Patent Document 1 allows an operator familiar with the numerical control program to control a robot without having to familiarize himself/herself with the robot program.

Patent Document 1: Japanese Patent No. 6647472

DISCLOSURE OF THE INVENTION

Problems to be Solved by the Invention

Meanwhile, the numerical control device of Patent Document 1 is based on a precondition that a numerical control program for machine tool and a numerical control program for robot are created based on machine tool coordinate system that has the origin at a reference point set with respect to the machine tool. Therefore, an operator responsible for creating the numerical control program needs to grasp the correspondence relationship between the above-described machine tool coordinate system and a robot coordinate system that has the origin at a reference point set with respect to the robot, which involves complicated tasks. For example, there is a case in which a plurality of numerical control devices control a plurality of machine tools and one robot, and in this case, a plurality of machine tool coordinate systems may be defined. Thus, the operator needs to address more complicated tasks.

There is a robot control device that directly controls operation of a robot according to a command signal transmitted from a numerical control device. In order for such a robot control device to appropriately perform kinematic transformation in the robot coordinate system and to control rotation angles of the joints of the robot accurately in accordance with a command, it is necessary to provide coordinate system conversion means (specifically, a coordinate system conversion table, for example) for converting coordinate values between the machine tool coordinate system and the robot coordinate system. Such conversion means increases the computational load, and as a result, the machining performance of the robot and the machine tool may deteriorate.

The present disclosure has been achieved in view of the disadvantages described above, and provides numerical control system that enables creation of a numerical control program for causing a numerical control device to control a robot, on the basis of a robot coordinate system.

Means for Solving the Problems

One aspect of the present disclosure is directed to a numerical control system including: a numerical control device configured to generate a machine tool command signal as a command directed to a machine tool in accordance with a first numerical control program described based on a first coordinate system, and a robot command signal as a command directed to a robot in accordance with a second numerical control program described based on a second coordinate system; and a robot control device communicable with the numerical control device and configured to control operation of the robot based on the robot command signal. The robot control device acquires coordinate values of the robot in the second coordinate system, and transmits the coordinate values as reference coordinate values to the numerical control device. The numerical control device generates the robot command signal based on the reference coordinate values transmitted from the robot control device and the second numerical control program.

Effects of the Invention

According to the one aspect of the present disclosure, the numerical control device generates a machine tool command signal directed to the machine tool in accordance with the first numerical control program described based on the first coordinate system, and a robot command signal directed to the robot in accordance with the second numerical control program described based on the second coordinate system. The robot control device is communicable with the numerical control device and controls the operation of the robot based on the robot command signal transmitted from the numerical control device. The robot control device acquires coordinate values of the robot in the second coordinate system, and transmits the coordinate values as reference coordinate values to the numerical control device. The numerical control device generates the robot command signal based on the reference coordinate values transmitted from the robot control device and the second numerical control program. Thus, according to the one aspect of the present disclosure, the numerical control device enables creation of the second numerical control program on the basis of the second coordinate system that is the same as the coordinate system that serves as the reference for the robot control device. This feature allows an operator to create a second numerical control program without having to recognize the relationship between the first coordinate system for the machine tool and the second coordinate system for the robot. Furthermore, according to the one aspect of the present disclosure, the numerical control device and the robot control device do not need to convert the coordinate values between the first coordinate system and the second coordinate system, whereby the computational load cab be reduced accordingly. Consequently, deterioration of machining performance of the robot and the machine tool can be suppressed as well.

BRIEF DESCRIPTION OF THE DRAWINGS

FIG. 4 illustrates an example of a numerical control program for robot;

PREFERRED MODE FOR CARRYING OUT THE INVENTION

A numerical control system 1 according to an embodiment of the present disclosure will be described with reference to the drawings.

Figure 1:
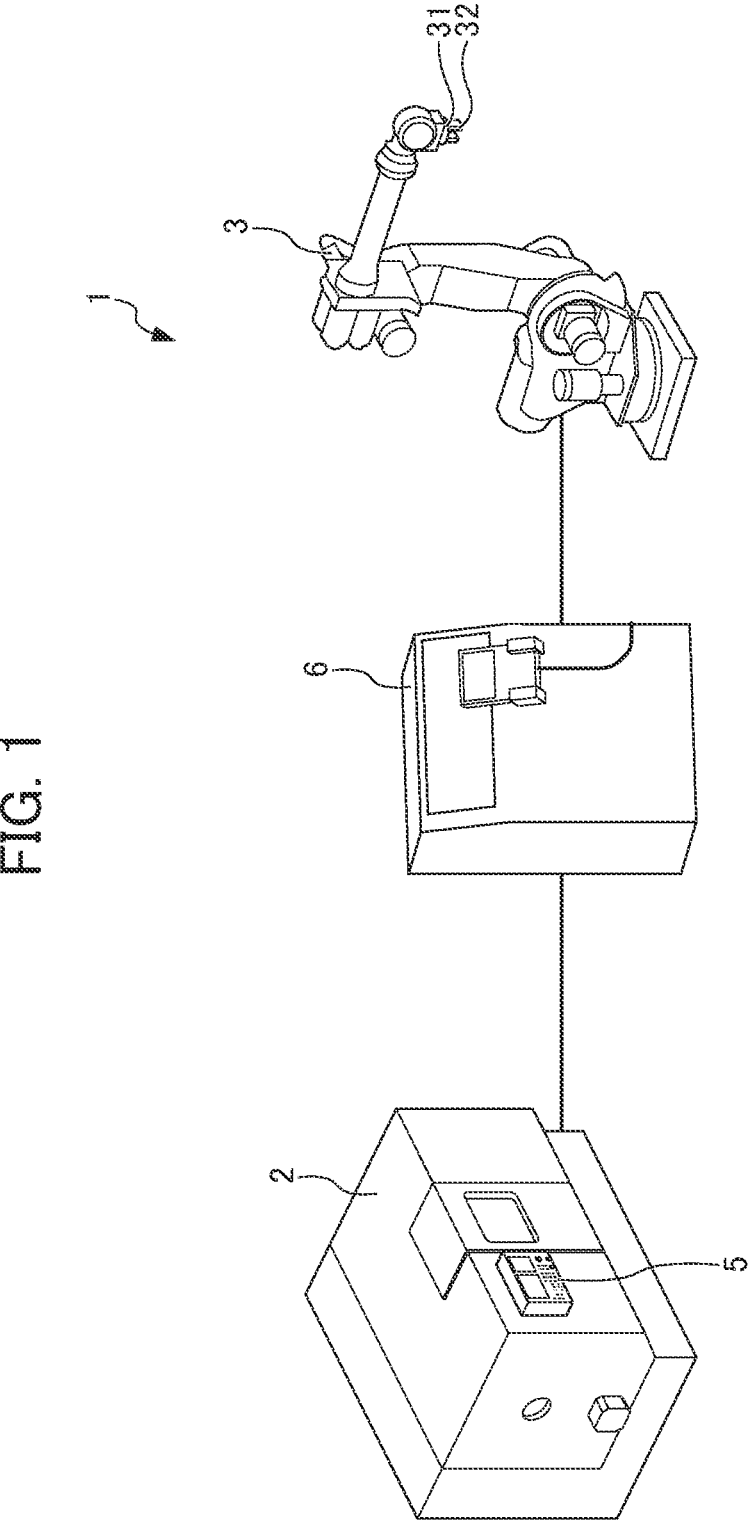
FIG. 1 is a schematic diagram illustrating a numerical control system according to an embodiment of the present disclosure.

FIG. 1 is a schematic diagram illustrating the numerical control system 1 according to the present embodiment.

The numerical control system 1 includes a machine tool 2, a numerical control device (CNC) 5 for controlling the machine tool 2, a robot 3 provided in the vicinity of the machine tool 2, and a robot control device 6 communicably connected to the numerical control device 5. The numerical control device 5 generates a machine tool command signal as a command directed to the machine tool 2 and a robot command signal as a command directed to the robot 3 in accordance with predetermined numerical control programs, and transmits the machine tool command signal and the robot command signal to the machine tool 2 and the robot control device 6. The robot control device 6 controls operation of the robot 3 in response to the robot command signal transmitted from the numerical control device 5.

The machine tool 2 machines a workpiece (not shown) in response to the machine tool command signal transmitted from the numerical control device 5. Here, examples of the machine tool 2 include, but are not limited to, a lathe, a drill press, a milling machine, a grinding machine, a laser processing machine, an injection molding machine, etc.

The robot 3 operates under the control of the robot control device 6, and performs a predetermined task with respect to a workpiece machined by the machine tool 2, for example. The robot 3 is, for example, an articulated robot, and has an arm distal end 31 to which a gripping tool 32 for gripping the workpiece is attached. In the following description, a non-limiting example will be described in which the robot 3 grips the workpiece machined by the machine tool 2 at a predetermined position with the gripping tool 32, and conveys the workpiece to a predetermined location. In the following non-limiting example, the robot 3 is a six-axis articulated robot, but the number of axes is not limited thereto.

The numerical control device 5 and the robot control device 6 are each a computer constituted by hardware including: an arithmetic processing means such as a central processing unit (CPU); an auxiliary storage means such as a hard disk drive (HDD) and a solid state drive (SSD) in which various programs are stored; a main storage means such as a random access memory (RAM) in which data temporarily required for the arithmetic processing means to execute the programs is stored; an operation means such as a keyboard with which an operator performs various operations; and a display means such as a display for displaying various kinds of information to the operator. The robot control device 6 and the numerical control device 5 can transmit and receive various signals to and from each other via Ethernet (registered trademark), for example.

Figure 2:
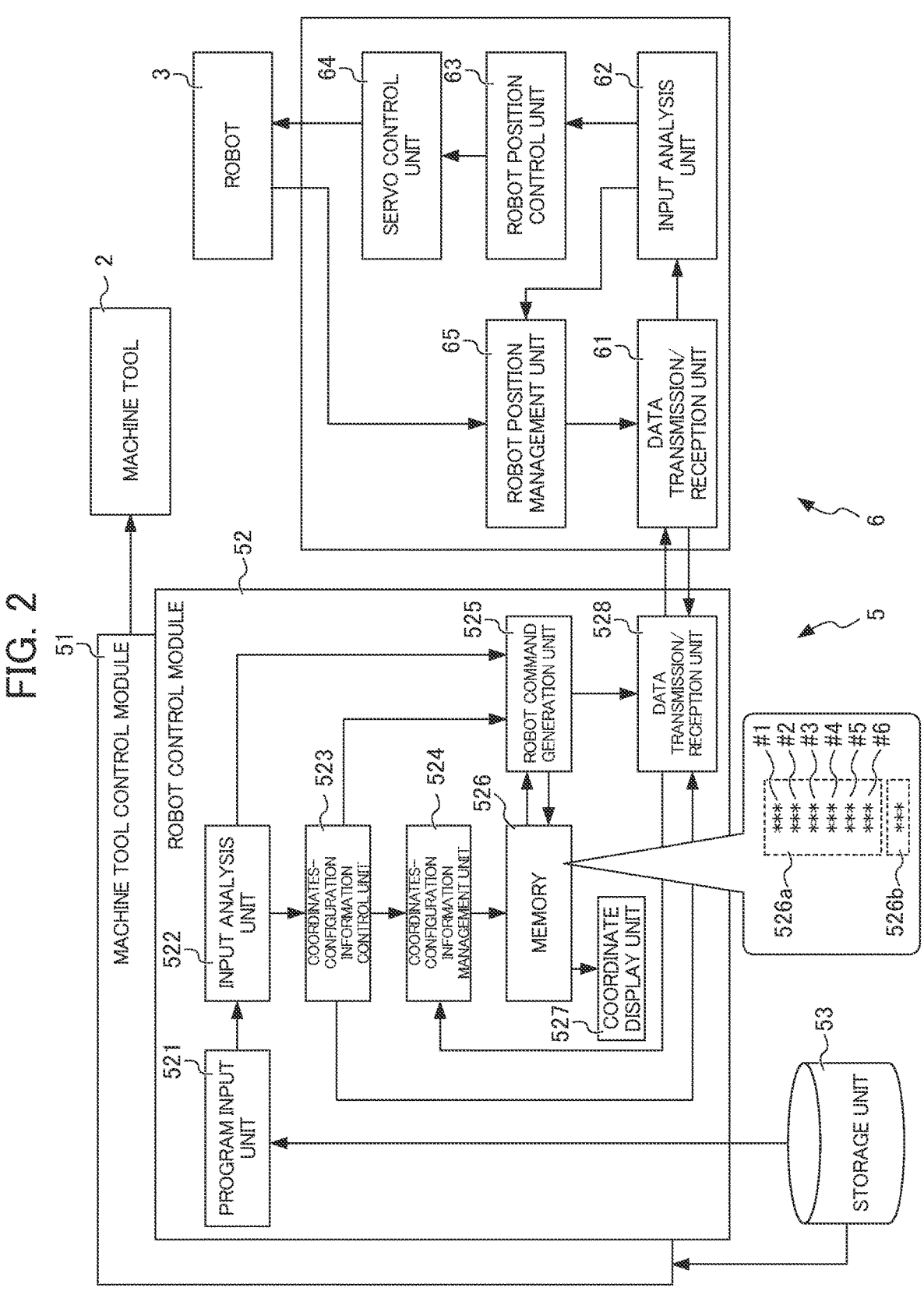
FIG. 2 is a functional block diagram of a numerical control device and a robot control device.

FIG. 2 is a functional block diagram of the numerical control device 5 and the robot control device 6.

As illustrated in FIG. 2, in the numerical control device 5, various functions, such as a machine tool control module 51 as a control system for the machine tool 2, a robot control module 52 as a control system for the robot 3, and a storage unit 53, are implemented by the aforementioned hardware configuration.

The storage unit 53 stores a plurality of numerical control programs created by way of, for example, operations by an operator. More specifically, the storage unit 53 stores, for example, a numerical control program for machine tool, which is a first numerical control program for controlling operation of the machine tool 2, and a numerical control program for robot, which is a second numerical control program for controlling operation of the robot 3. The numerical control program for machine tool and the numerical control program for robot are written in a common programming language (for example, G code).

The numerical control program for machine tool is described based on a machine tool coordinate system, which is a first coordinate system having the origin at a reference point set on the machine tool 2 or in the vicinity of the machine tool 2. Thus, in the numerical control program for machine tool, the position and posture of a control point of the machine tool 2 are described by means of coordinate values in the machine tool coordinate system.

The numerical control program for robot is described based on a robot coordinate system, which is a second coordinate system different from the machine tool coordinate system. Thus, in the numerical control program for robot, the position and posture of a control point of the robot 3 (e.g., the arm distal end 31 of the robot 3) are described by means of coordinate values in the robot coordinate system different from the machine tool coordinate system. The robot coordinate system is a coordinate system having the origin at a reference point set on the robot 3 or in the vicinity of the robot 3. In the following, an example in which the robot coordinate system is different from the machine tool coordinate system will be described, but the present disclosure is not limited thereto. The robot coordinate system may coincide with the machine tool coordinate system. In other words, the origin and the directions of the coordinate axes of the robot coordinate system may coincide with the origin and the directions of the coordinate axes of the machine tool coordinate system.

In the numerical control program for robot, the robot coordinate system is switchable between two or more coordinate formats having different control axes. More specifically, in the numerical control program for robot, the position and posture of a control point of the robot 3 can be specified in a rectangular coordinate format or a joint coordinate format.

In the joint coordinate format, the position and posture of the control point of the robot 3 are specified by means of six coordinate values in total, which are real numbers and have, as components thereof, rotational angle values ($J1$, $J2$, $J3$, $J4$, $J5$, $J6$) of the six joints of the robot 3.

In the rectangular coordinate format, the position and posture of the control point of the robot 3 are specified by means of six coordinate values in total, which are real numbers and have, as components thereof, three coordinate values ($X$, $Y$, $Z$) along the three orthogonal coordinate axes and three rotational angle values ($A$, $B$, $C$) around the respective orthogonal coordinate axes.

Here, in the joint coordinate format, the rotational angles of the joints of the robot 3 are directly specified, and accordingly, the axis arrangement of the arms and wrist of the robot 3 and a rotation number of the joints that can rotate by 360 degrees or more (hereinafter, these are collectively referred to as "configuration of the robot 3") are uniquely determined. In contrast, in the rectangular coordinate format, since the position and posture of the control point of the robot 3 are specified by means of the six coordinate values (X, Y, Z, A, B, C), the configuration of the robot 3 cannot be uniquely determined. Therefore, in the numerical control program for robot, the configuration of the robot 3 can be specified by means of a configuration value P which is an integer with a predetermined number of digits. Thus, the position and posture of the control point of the robot 3 and the configuration of the robot 3 are represented by the six coordinate values (J1, J2, J3, J4, J5, J6) in the joint coordinate format, and are represented by the six coordinate values and one configuration value (X, Y, Z, A, B, C, P) in the rectangular coordinate format.

In the numerical control program for robot, the coordinate format can be set with the G codes "G68.8" and "G68.9". More specifically, the coordinate format is set to the joint coordinate format by inputting the G code "G68.8", whereas the coordinate format is set to the rectangular coordinate format by inputting the G code "G68.9". The G codes "G68.8" and "G68.9" for setting the coordinate formats are modal codes. Accordingly, once the coordinate format is set to the joint coordinate format or the rectangular coordinate format by the corresponding G code, the set coordinate format is maintained until the coordinate format is switched again by the other G code. In the present embodiment, in a case where the numerical control program for robot does not contain the G codes for setting the coordinate formats, the coordinate format is automatically set to the rectangular coordinate format. However, this is a non-limiting example.

The machine tool control module 51 generates the machine tool command signal as a command directed to the machine tool 2 in accordance with the numerical control program for machine tool, and inputs the machine tool command signal to an actuator (not shown) of the machine tool 2. More specifically, the machine tool control module 51 reads the numerical control program for machine tool stored in the storage unit 53, analyzes a command type that is based on the numerical control program, and thereby generates the machine tool command signal. The machine tool 2 operates in response to the machine tool command signal transmitted from the machine tool control module 51 to thereby machine a workpiece (not shown).

The robot control module 52 generates, in accordance with the numerical control program for robot, the robot command signal as a command directed to the robot 3 and various request signals directed to the robot control device 6, and transmits the signals to the robot control device 6. More specifically, the robot control module 52 includes a program input unit 521, an input analysis unit 522, a coordinates-configuration information control unit 523, a coordinates-configuration information management unit 524, a robot command signal generation unit 525, a memory 526, a coordinate display unit 527, and a data transmission/reception unit 528, and generates the robot command signal and various request signals by means of these units.

The program input unit 521 reads numerical control programs for robot from the storage unit 53, and sequentially inputs the numerical control programs to the input analysis unit 522.

The input analysis unit 522 sequentially analyzes the command types that are based on the numerical value control programs inputted from the program input unit 521 for each block, and transmits the analysis results to the coordinates-configuration information control unit 523 and the robot command signal generation unit 525.

Based on the analysis result inputted from the input analysis unit 522, the coordinates-configuration information control unit 523 identifies a designated coordinate format that is a coordinate format set in accordance with the numerical control program for robot. As described above, in the numerical control program for robot, the coordinate format can be set or switched to the joint coordinate format or the rectangular coordinate format by means of the predetermined G codes. The coordinates-configuration information control unit 523 identifies the designated coordinate format based on the analysis result inputted from the input analysis unit 522, and transmits information regarding the currently designated coordinate format to the coordinates-configuration information management unit 524 and the robot command signal generation unit 525.

Further, the coordinates-configuration information control unit 523 writes a reference coordinate value request signal and a reference configuration value request signal to the data transmission/reception unit 528 at a predetermined timing during execution of the numerical control program for robot. The reference coordinate value request signal is for newly acquiring, from the robot control device 6, reference coordinate values corresponding to current coordinate values of the control axes in the designated coordinate format, which has been identified. The reference configuration value request signal is for newly acquiring a reference configuration value corresponding to a current configuration value of the robot 3 from the robot control device 6. The reference coordinate value request signal and the reference configuration value request signal are then transmitted to the robot control device 6. The timing at which the reference coordinate value request signal and the reference configuration value request signal are transmitted to the robot control device 6 will be described in detail later.

The coordinates-configuration information management unit 524 manages, in the memory 526, coordinate information including as components the coordinate values of the control axes of the designated coordinate format, which has been identified by the coordinates-configuration information control unit 523, and configuration information including as component the configuration value of the robot 3. As illustrated in FIG. 2, the memory 526 includes a coordinate information storage area 526a for storing coordinate values as a plurality of components and a configuration information storage area 526b for storing the configuration value. The memory 526 stores a plurality of sets of coordinate values in the coordinate information storage area 526a, and one set of configuration values in the configuration information storage area 526b, for example. The number of the sets of coordinate values that can be stored in the coordinate information storage area 526a, i.e., the number of components of the coordinate information that is managed by the coordinates-configuration information management unit 524 and the memory 526, is preferably smaller than the sum of six that is the number of control axes in the rectangular coordinate format and six that is the number of control axes in the joint coordinate format. Hereinafter, a case where the number of the sets of coordinate values that can be stored in the coordinate information storage area 526a is six, which is the number of the control axes in the rectangular coordinate format and the number of the control axes in the joint coordinate format will be described, but the present disclosure is not limited to such a case.

In a case where the designated coordinate format is the joint coordinate format, the coordinates-configuration information management unit 524 acquires the coordinate values (J1, J2, J3, J4, J5, J6) of the control axes of the robot 3 in the joint coordinate format, in accordance with a procedure to be described later with reference to FIGS. 3A and 3B, and stores these coordinate values in a first component #1, a second component #2, a third component #3, a fourth component #4, a fifth component #5, and a sixth component #6 of the coordinate information storage area 526*a*.

In a case where the designated coordinate format is the rectangular coordinate format, the coordinates-configuration information management unit 524 acquires the coordinate values (X, Y, Z, A, B, C) of the control axes of the robot 3 in the rectangular coordinate format, in accordance with the procedure to be described later with reference to FIGS. 3A and 3B, and stores these coordinate values in the first to sixth components #1 to #6 of the coordinate information storage area 526*a*. In the case where the designated coordinate format is the rectangular coordinate format, the coordinates-configuration information management unit 524 acquires the configuration value P of the robot 3 in accordance with the procedure to be described later with reference to FIGS. 3A and 3B, and stores the configuration value P in the configuration information storage area 526*b*.

Figure 3A:
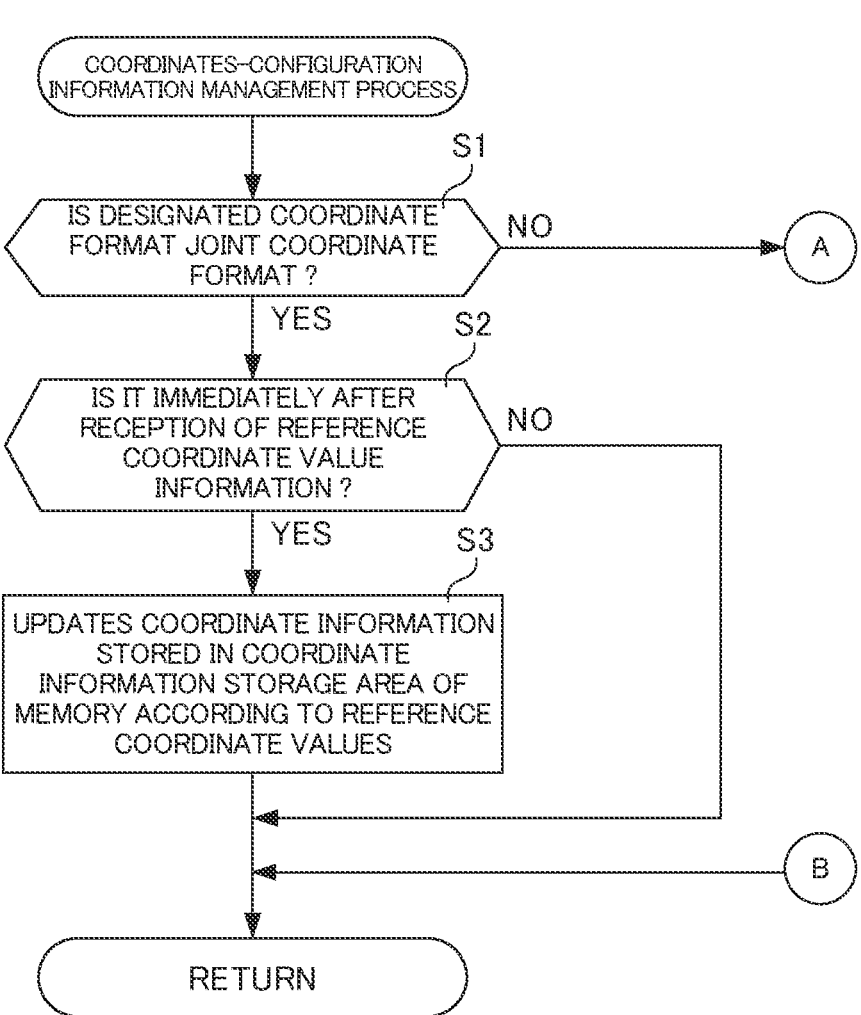
FIG. 3A is a flowchart (part 1) illustrating a procedure of a coordinates-configuration information management process.
Figure 3B:
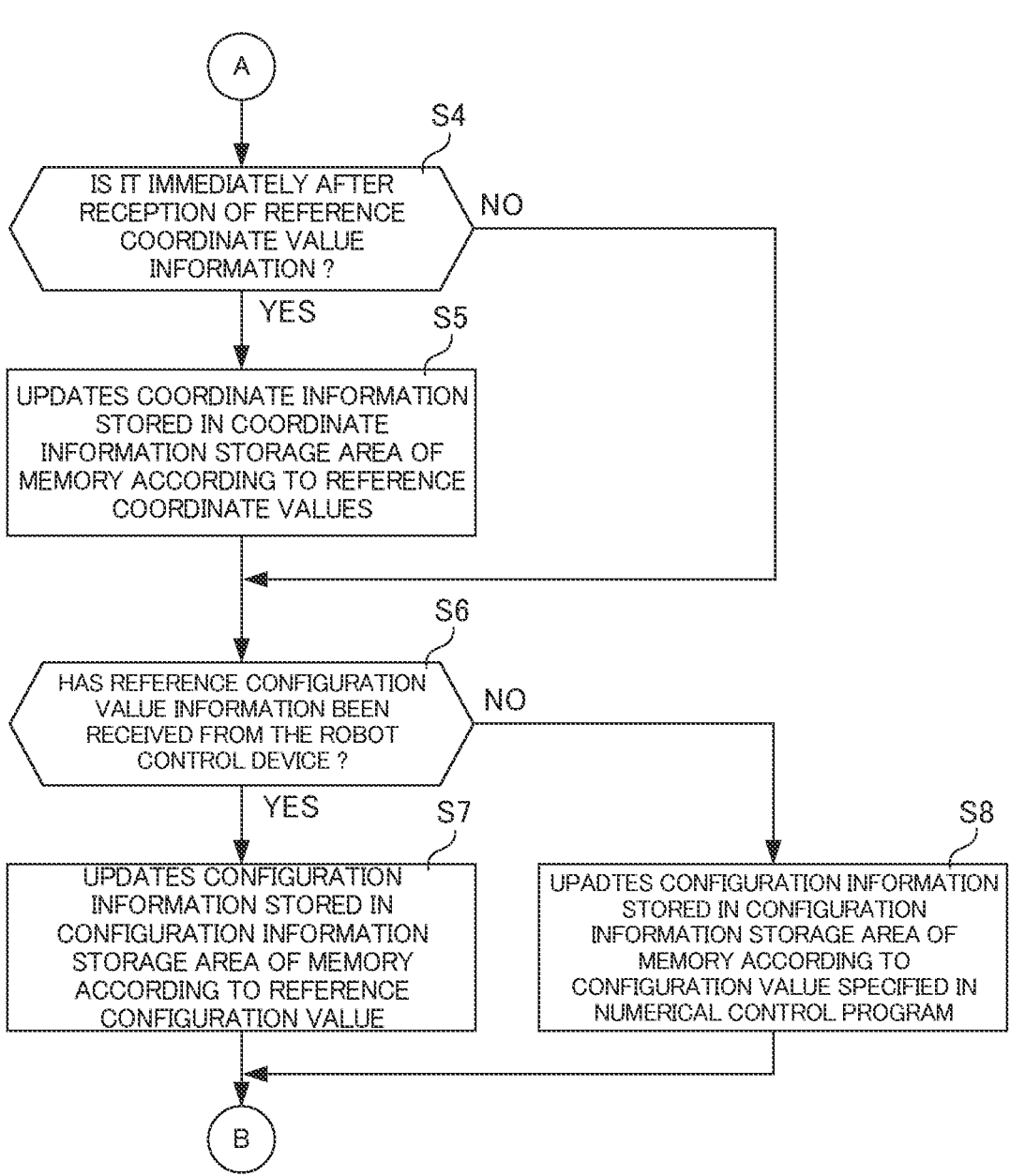
FIG. 3B is a flowchart (part 2) illustrating the procedure of the coordinates-configuration information management process.

FIGS. 3A and 3B are flowcharts showing the procedure of a process of managing the coordinate information and the configuration information in the designated coordinate format (hereinafter referred to as "coordinates-configuration information management process"), which is performed by the coordinates-configuration information management unit 524 and the memory 526. The coordinates-configuration information management process shown in FIGS. 3A and 3B is repeatedly performed in predetermined cycles by the coordinates-configuration information management unit 524 during execution of the numerical control program for robot by the robot control module 52.

First, in Step S1, the coordinates-configuration information management unit 524 determines whether or not the designated coordinate format is the joint coordinate format. If the determination result in Step S1 is YES, the coordinates-configuration information management unit 524 proceeds to Step S2, whereas if the determination result in Step S1 is NO, the coordinates-configuration information management unit 524 proceeds to Step S4.

In Step S2, the coordinates-configuration information management unit 524 determines whether or not it is immediately after reception of reference coordinate value information including latest reference coordinate values from the robot control device 6. As described above, the reference coordinate values are the current coordinate values of the control axes in the designated coordinate format. As will be described later, the robot control device 6 acquires the reference coordinate values in response to a reference coordinate value request signal that is transmitted at a predetermined timing from the coordinates-configuration information control unit 523, and sends back reference coordinate value information including the reference coordinate values to the numerical control device 5. If the determination result in Step S2 is YES, the coordinates-configuration information management unit 524 proceeds to Step S3, whereas if the determination result in Step S2 is NO, the coordinates-configuration information management unit 524 ends the process shown in FIGS. 3A and 3B.

In Step S3, the coordinates-configuration information management unit 524 updates the coordinate information stored in the coordinate information storage area 526*a* of the memory 526 according to the reference coordinate values transmitted from the robot control device 6, and then, ends the process shown in FIGS. 3A and 3B. More specifically, the coordinates-configuration information management unit 524 replaces the coordinate values stored in the components #1 to #6 of the coordinate information storage area 526*a* with the reference coordinate values transmitted from the robot control device 6.

In Step S4, the coordinates-configuration information management unit 524 determines whether or not it is immediately after reception of reference coordinate value information including latest reference coordinate values from the robot control device 6. If the determination result in Step S4 is YES, the coordinates-configuration information management unit 524 proceeds to Step S5, whereas if the determination result in Step S4 is NO, the coordinates-configuration information management unit 524 proceeds to Step S6.

In Step S5, the coordinates-configuration information management unit 524 updates the coordinate information stored in the coordinate information storage area 526*a* of the memory 526 according to the reference coordinate values transmitted from the robot control device 6 in accordance with the same procedure as in Step S3 described above, and then, proceeds to Step S6.

In Step S6, the coordinates-configuration information management unit 524 determines whether or not reference configuration value information including a latest reference configuration value has been received from the robot control device 6. As described above, the reference configuration value is the current configuration value of the robot 3. As will be described later, the robot control device 6 acquires the reference configuration value in response to a reference configuration value request signal that is transmitted at a predetermined timing from the coordinates-configuration information control unit 523, and sends back reference configuration value information including the reference configuration value to the numerical control device 5. If the determination result in Step S6 is YES, the coordinates-configuration information management unit 524 proceeds to Step S7, whereas if the determination result in Step S6 is NO, the coordinates-configuration information management unit 524 proceeds to Step S8.

In Step S7, the coordinates-configuration information management unit 524 updates the configuration information stored in the configuration information storage area 526*b* of the memory 526 according to the reference configuration value transmitted from the robot control device 6, and then, ends the process shown in FIGS. 3A and 3B. More specifically, the coordinates-configuration information management unit 524 replaces the configuration value stored in the configuration information storage area 526*b* of the memory 526 with the reference configuration value transmitted from the robot control device 6.

In Step S8, the coordinates-configuration information management unit 524 updates the configuration information stored in the configuration information storage area 526*b* of the memory 526 according to the configuration value specified in the numerical control program and inputted from the input analysis unit 522, and then, ends the process shown in FIGS. 3A and 3B.

As described above, the coordinates-configuration information management unit 524 updates the coordinate information stored in the coordinate information storage area 526*a* of the memory 526 to the reference coordinate values, at the timing of receiving the reference coordinate values transmitted from the robot control device 6.

In the case where the designated coordinate format is the rectangular coordinate format, the coordinates-configuration information management unit 524 updates the configuration information stored in the configuration information storage area 526b of the memory 526 according to the reference configuration value transmitted from the robot control device 6 or the configuration value specified in the numerical control program. More specifically, in the case of receiving the reference configuration value transmitted from the robot control device 6, the coordinates-configuration information management unit 524 updates the configuration information stored in the configuration information storage area 526b according to the reference configuration value, and otherwise, updates the configuration information stored in the configuration information storage area 526b according to the configuration value specified in the numerical control program.

Referring back to FIG. 2, the coordinate display unit 527 reads the coordinate information stored in the coordinate information storage area 526a of the memory 526 in predetermined cycles during execution of the numerical control program for robot, and displays the coordinate information together with the designated coordinate format on a display (not shown). This allows the operator to check the position and posture of the robot 3 with reference to the numerical values.

Based on the latest coordinate information and the latest configuration information stored in the memory 526 and the analysis result of the numerical control program inputted from the input analysis unit 522, the robot command signal generation unit 525 generates a robot command signal in accordance with the numerical control program, writes the generated robot command signal to the data transmission/reception unit 528, and transmits the robot command signal to the robot control device 6.

Here, a case will be described in which the command type based on the numerical control program causes a change in the position and posture of the control point of the robot 3 or a change in the configuration of the robot 3 (specifically, a case where the G code is "G00" corresponding to positioning (fast feeding) or "G01" corresponding to linear interpolation, etc.). In this case, the robot command signal generation unit 525 calculates, in the designated coordinate format, an end point and a speed of the control point of the robot 3 while setting the coordinate values stored in the coordinate information storage area 526a of the memory 526 as the starting point for the control point of the robot 3, and writes a robot command signal including the information regarding the designated coordinate format, the end point, and the speed to the data transmission/reception unit 528. After calculating the coordinate values of the end point of the control point of the robot 3 in the above-described manner, the robot command signal generation unit 525 updates the starting point coordinate values stored in the coordinate information storage area 526a of the memory 526 according to the calculated end point coordinate values.

As described earlier, the configuration of the robot 3 cannot be determined uniquely in the rectangular coordinate format. Therefore, when the designated coordinate format is the rectangular coordinate format, the robot command signal generation unit 525 regards the coordinate values stored in the coordinate information storage area 526a of the memory 526 as the starting point for the control point of the robot 3, calculates an end point and a speed for the control point of the robot 3 and a configuration value at the end point, and writes a robot command signal including the information regarding the designated coordinate format, the end point, the speed, and the configuration value at the end point to the data transmission/reception unit 528. After calculating the coordinate values of the end point of the control point of the robot 3 in the above-described manner, the robot command signal generation unit 525 updates the starting point coordinate values stored in the coordinate information storage area 526a of the memory 526 according to the calculated end point coordinate values.

Next, the timing at which the coordinates-configuration information control unit 523 generates the reference coordinate value request signal and the reference configuration value request signal and transmits these request signals to the robot control device 6 will be described. As described above, the reference coordinate value request signal and the reference configuration value request signal function as a trigger for updating the coordinate information and the configuration information stored in the memory 526 according to the information transmitted from the robot control device 6. Accordingly, the coordinates-configuration information control unit 523 determines whether or not it is necessary to acquire the reference coordinate values or the reference configuration value during execution of the numerical control program for robot by the robot control module 52, and transmits the reference coordinate value request signal to the robot control device 6 upon determining that acquisition of the reference coordinate values is necessary, and transmits the reference configuration value request signal to the robot control device 6 upon determining that acquisition of reference configuration value is necessary.

More specifically, the coordinates-configuration information control unit 523 determines it necessary to acquire the reference coordinate values in the following cases: when the execution of the numerical control program for robot is started, when the numerical control program for robot interrupted for some reason is restarted, when the designated coordinate format is newly set in accordance with the numerical control program for robot, and when the designated coordinate format is switched in accordance with the numerical control program for robot. In these cases, the coordinates-configuration information control unit 523 writes the reference coordinate value request signal to the data transmission/reception unit 528. In response, the reference coordinate value request signal is transmitted from the data transmission/reception unit 528 to the robot control device 6.

The coordinates-configuration information control unit 523 determines it necessary to acquire the reference configuration value at least in the case where the designated coordinate format is the rectangular coordinate format, and writes the reference configuration value request signal to the data transmission/reception unit 528. In response, the reference configuration value request signal is transmitted from the data transmission/reception unit 528 to the robot control device 6. More specifically, in a case where the execution of the numerical control program for robot is started while the designated coordinate format is set to the rectangular coordinate format and in a case where the designated coordinate format is the rectangular coordinate format and a configuration value is not specified in the numerical control program, the coordinates-configuration information control unit 523 determines it necessary to acquire the reference configuration value, and transmits the reference configuration value request signal to the robot control device 6. In a case where the designated coordinate format is the rectangular coordinate format and a configuration value is specified in the numerical control program, the coordinates-configuration information control unit 523 determines it unnecessary to acquire the reference configuration value, and does not transmit the reference configuration value request signal to the robot control device 6. In other words, in the case where a configuration value is specified in the numerical control program, the coordinates-configuration information control unit 523 generates a robot command signal while giving priority to the configuration value specified in the numerical control program over a reference configuration value that is acquired in the robot control device 6.

In response to the robot command signal generation unit 525 writing a robot command signal, the data transmission/reception unit 528 transmits the robot command signal to the data transmission/reception unit 61 of the robot control device 6. In response to the coordinates-configuration information control unit 523 writing a reference coordinate value request signal or a reference configuration value request signal, the data transmission/reception unit 528 transmits the reference coordinate value request signal or the reference configuration value request signal to the data transmission/reception unit 61 of the robot control device 6.

Upon receiving reference coordinate value information or reference configuration value information transmitted from the data transmission/reception unit 61 of the robot control device 6, the data transmission/reception unit 528 transmits the reference coordinate value information or the reference configuration value information to the coordinates-configuration information management unit 524.

As shown in FIG. 2, the robot control device 6 is provided with various functions such as the data transmission/reception unit 61, an input analysis unit 62, a robot position control unit 63, a servo control unit 64, and a robot position management unit 65 that are implemented by the hardware configuration described above.

Upon receiving the robot command signal, the reference coordinate value request signal, and the reference configuration value request signal transmitted from the data transmission/reception unit 528 of the numerical control device 5, the data transmission/reception unit 61 transmits these signals to the input analysis unit 62.

In response to the robot position management unit 65 writing reference coordinate value information or reference configuration value information, the data transmission/reception unit 61 transmits the reference coordinate value information or the reference configuration value information to the data transmission/reception unit 528 of the numerical control device 5.

Upon receiving the robot command signal transmitted from the data transmission/reception unit 61, the input analysis unit 62 performs conversion into a robot program for controlling the robot 3 based on the robot command signal, and transmits the robot program to the robot position control unit 63. Upon receiving the reference coordinate value request signal or the reference configuration value request signal transmitted from the data transmission/reception unit 61, the input analysis unit 62 transmits the request signal to the robot position management unit 65.

The robot position control unit 63 performs kinematic transformation in accordance with the robot program transmitted from the input analysis unit 62 to thereby generate commands directed to a plurality of servo motors (not shown) that rotate the joints of the robot 3, and inputs the commands to the servo control unit 64.

The servo control unit 64 performs feedback control on the servo motors of the robot 3 so as to implement the commands inputted from the robot position control unit 63.

Upon receiving the reference coordinate value request signal transmitted from the input analysis unit 62, the robot position management unit 65 acquires detection values from various position sensors (not shown) provided to the robot 3, and calculates the coordinate values of the control axes of the robot coordinate system in the designated coordinate format, based on the detection values. The robot position management unit 65 sets the calculated coordinate values as reference coordinate values, and writes reference coordinate value information including the reference coordinate values to the data transmission/reception unit 61. In response, the data transmission/reception unit 61 transmits the reference coordinate value information to the numerical control device 5.

Upon receiving the reference configuration value request signal transmitted from the input analysis unit 62, the robot position management unit 65 acquires detection values from the various position sensors provided to the robot 3, and calculates a configuration value of the robot 3 based on the detection values. The robot position management unit 65 sets the calculated configuration value as a reference configuration value, and writes reference configuration value information including the reference configuration value to the data transmission/reception unit 61. In response, the data transmission/reception unit 61 transmits the reference configuration value information to the numerical control device 5.

Figure 5A:
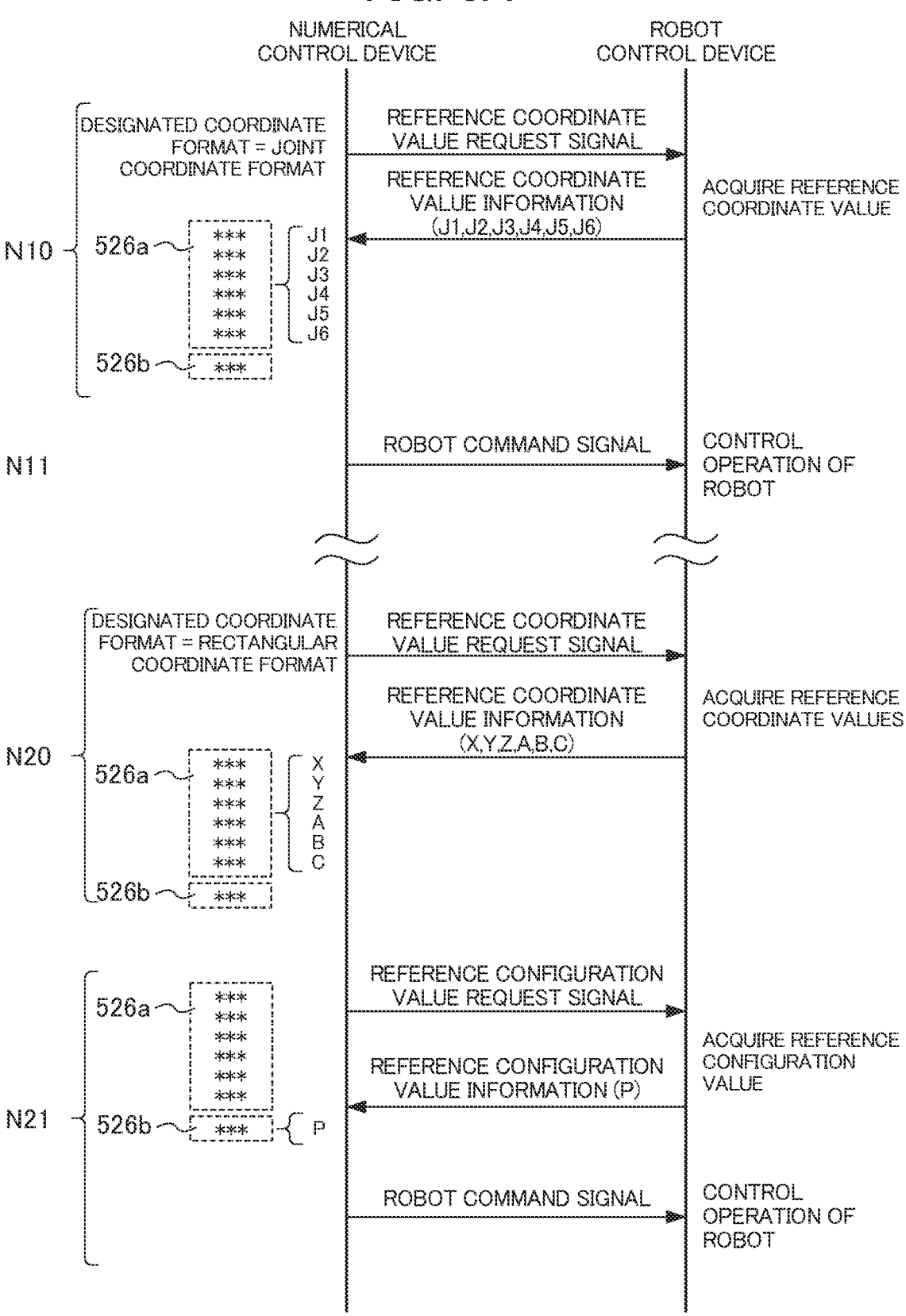
FIG. 5A is a sequence diagram (part 1) in a case where a numerical control device is operated in accordance with the numerical control program for robot illustrated in FIG. 4.
Figure 5B:
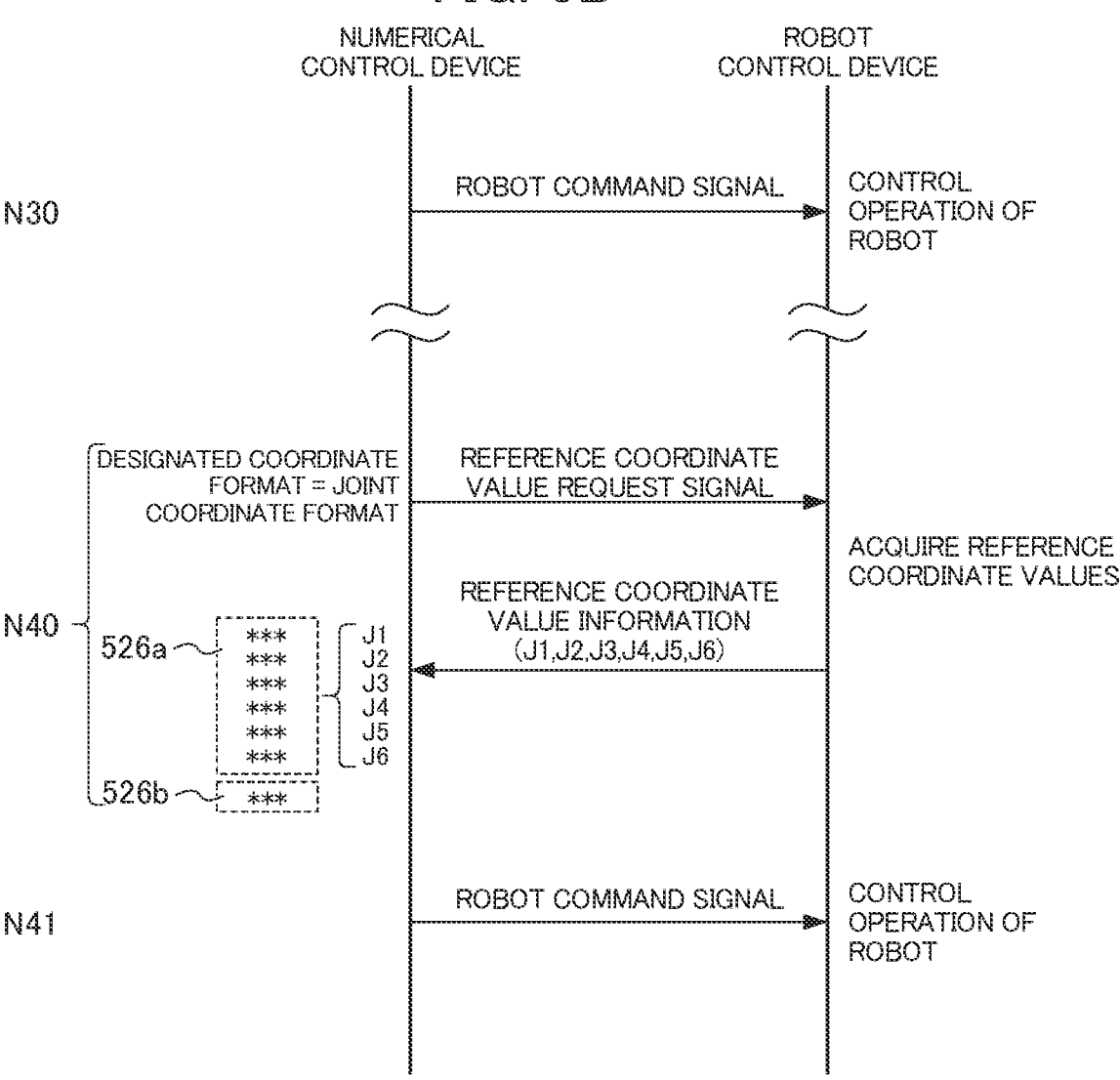
FIG. 5B is a sequence diagram (part 2) in the case where the numerical control device is operated in accordance with the numerical control program for robot illustrated in FIG. 4.

Next, a flow of the various signals and information in the numerical control system 1 having the above-described configuration will be described with reference to FIGS. 4, 5A, and 5B.

Figure 4:
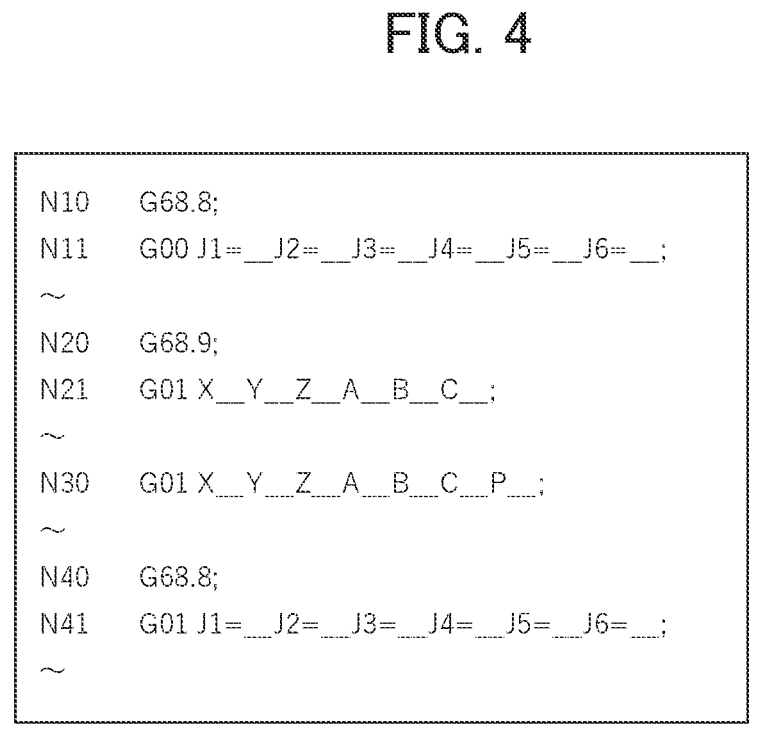

FIG. 4 illustrates an example of a numerical control program for robot. FIGS. 5A and 5B are sequence diagrams showing the flow of signals and information between the numerical control device 5 and the robot control device 6 in a case where the numerical control device 5 is operated in accordance with the numerical control program for robot illustrated in FIG. 4.

First, in a block denoted by the sequence number "N10", a command "G68.8" is inputted to the coordinates-configuration information control unit 523 of the numerical control device 5. In response to this, the coordinates-configuration information control unit 523 sets the joint coordinate format as the designated coordinate format. Further, in response to setting of the designated coordinate format for the first time in this block, the coordinates-configuration information control unit 523 transmits a reference coordinate value request signal to the robot position management unit 65 of the robot control device 6. In response to reception of the reference coordinate value request signal, the robot position management unit 65 of the robot control device 6 acquires reference coordinate values (J1, J2, J3, J4, J5, J6) in the currently designated coordinate format, and transmits reference coordinate value information including these reference coordinate values to the coordinates-configuration information management unit 524 of the numerical control device 5. The coordinates-configuration information management unit 524 of the numerical control device 5 updates coordinate information stored in the coordinate information storage area 526a of the memory 526 according to the received reference coordinate values.

Next, in a block denoted by the sequence number "N11", a command "G00 J1=_J2=_J3=_J4=_J5=_J6=_" that is based on the joint coordinate format is inputted to the robot command signal generation unit 525 of the numerical control device 5. Note that a coordinate value of an end point is inputted to the spaces with the underbars in the command. The robot command signal generation unit 525 generates a robot command signal based on the coordinate information stored in the coordinate information storage area 526a of the memory 526 and the inputted command, and transmits the robot command signal to the robot control device 6. The robot control device 6 controls the operation of the robot 3 based on the received robot command signal. Subsequent to this, the robot command signal generation unit 525 of the numerical control device 5 updates, according to the numerical control program, the coordinate information stored in the coordinate information storage area 526a on the basis of the reference coordinate values acquired in the block of the sequence number "N10", until the designated coordinate format is switched in a block of the sequence number "N20".

Next, in the block denoted by the sequence number "N20", a command "G68.9" is inputted to the coordinates-configuration information control unit 523 of the numerical control device 5. In response to this, the coordinates-configuration information control unit 523 switches the designated coordinate format from the joint coordinate format, which is currently designated, to the rectangular coordinate format. Further, in response to the switching of the designated coordinate formats in this block, the coordinates-configuration information control unit 523 transmits a reference coordinate value request signal to the robot position management unit 65 of the robot control device 6. In response to reception of the reference coordinate value request signal, the robot position management unit 65 of the robot control device 6 acquires reference coordinate values (X, Y, Z, A, B, C) in the currently-designated coordinate format, and transmits reference coordinate value information including these reference coordinate values to the coordinates-configuration information management unit 524 of the numerical control device 5. The coordinates-configuration information management unit 524 of the numerical control device 5 updates the coordinate information stored in the coordinate information storage area 526a of the memory 526 according to the received reference coordinate values.

Next, in a block denoted by the sequence number "N21", a command "G01 X_Y_Z_A_B_C_" based on the rectangular coordinate format is inputted to the coordinates-configuration information control unit 523 and the robot command signal generation unit 525 of the numerical control device 5. Note that the command inputted in this block does not specify any configuration value of the robot 3. In the case where the designated coordinate format is the rectangular coordinate format and the command inputted in this block does not specify any configuration value, the coordinates-configuration information control unit 523 determines that it is necessary to acquire a reference configuration value, and transmits a reference configuration value request signal to the robot position management unit 65 of the robot control device 6. In response to reception of the reference configuration value request signal, the robot position management unit 65 acquires a current configuration value (P) of the robot 3, and transmits reference configuration value information including this reference configuration value to the coordinates-configuration information management unit 524 of the numerical control device 5. The coordinates-configuration information management unit 524 updates the configuration information stored in the configuration information storage area 526b of the memory 526 according to the received reference configuration value.

Following the updating of the configuration information in the described-above manner, the robot command signal generation unit 525 of the numerical control device 5 generates a robot command signal based on the coordinate information stored in the coordinate information storage area 526a of the memory 526, the configuration information stored in the configuration information storage area 526b of the memory 526, and the inputted command, and transmits the robot command signal to the robot control device 6. The robot control device 6 controls the operation of the robot 3 based on the received robot command signal. Subsequent to this, the robot command signal generation unit 525 of the numerical control device 5 updates, according to the numerical control program, the coordinate information stored in the coordinate information storage area 526a on the basis of the reference coordinate values acquired in the block of the sequence number "N20", until the designated coordinate format is switched in a block of the sequence number "N40".

Next, in a block denoted by the sequence number "N30", a command "G01 X_Y_Z_A_B_C_P_" based on the rectangular coordinate format is inputted to the coordinates-configuration information control unit 523 and the robot command signal generation unit 525 of the numerical control device 5. Note that a configuration value of the robot 3 is specified in the command inputted in this block. In the case where a configuration value is specified in the command, the coordinates-configuration information control unit 523 does not transmit a reference configuration value request signal, unlike the process in the block denoted by the sequence number "N21". In this case, the coordinates-configuration information management unit 524 of the numerical control device 5 updates the configuration information stored in the configuration information storage area 526b according to the configuration value specified in the inputted command.

Following the updating of the configuration information in the described-above manner, the robot command signal generation unit 525 of the numerical control device 5 generates a robot command signal based on the coordinate information stored in the coordinate information storage area 526a of the memory 526, the configuration information stored in the configuration information storage area 526b of the memory 526, and the inputted command, and transmits the robot command signal to the robot control device 6. The robot control device 6 controls the operation of the robot 3 based on the received robot command signal.

Next, in the block denoted by the sequence number "N40", a command "G68.8" is inputted to the coordinates-configuration information control unit 523 of the numerical control device 5. In response to this, the coordinates-configuration information control unit 523 switches the designated coordinate format from the rectangular coordinate format, which is currently designated, to the joint coordinate format. Further, in response to the switching of the designated coordinate formats in this block, the coordinates-configuration information control unit 523 transmits a reference coordinate value request signal to the robot position management unit 65 of the robot control device 6. In response to reception of the reference coordinate value request signal, the robot position management unit 65 acquires reference coordinate values (J1, J2, J3, J4, J5, J6) in the currently designated coordinate format, and transmits reference coordinate value information including these reference coordinate values to the coordinates-configuration information management unit 524 of the numerical control device 5. The coordinates-configuration information management unit 524 updates the coordinate information stored in the coordinate information storage area 526a of the memory 526 according to the received reference coordinate values.

Next, in a block denoted by the sequence number "N41", a command "G01J1=_J2=_J3=_J4=_J5=_J6=_" based on the joint coordinate format is inputted to the robot command signal generation unit 525 of the numerical control device 5. The robot command signal generation unit 525 generates a robot command signal based on the coordinate information stored in the coordinate information storage area 526*a* of the memory 526 and the inputted command, and transmits the robot command signal to the robot control device 6. The robot control device 6 controls the operation of the robot 3 based on the received robot command signal. Subsequent to this, the robot command signal generation unit 525 of the numerical control device 5 updates, according to the numerical control program, the coordinate information stored in the coordinate information storage area 526*a* on the basis of the reference coordinate values acquired in the block of the sequence number "N40", until the designated coordinate format is switched.

The present embodiment provides the following effects. The numerical control device 5 generates a machine tool command signal directed to the machine tool 2 in accordance with the numerical control program for machine tool described based on the machine tool coordinate system, and a robot command signal directed to the robot 3 in accordance with the numerical control program for robot described based on the robot coordinate system. The robot control device 6 is communicable with the numerical control device 5 and controls the operation of the robot 3 based on the robot command signal transmitted from the numerical control device 5. The robot control device 6 acquires coordinate values of the robot 3 in the robot coordinate system, and transmits the coordinate values as reference coordinate values to the numerical control device 5. The numerical control device 5 generates the robot command signal based on the reference coordinate values transmitted from the robot control device 6 and the numerical control program for robot. Thus, according to the present embodiment, the numerical control device 5 enables creation of a numerical control program for robot on the basis of the same coordinate system as the robot coordinate system that serves as the reference for the robot control device 6. This feature allows the operator to create a numerical control program for robot without having to recognize the relationship between the machine tool coordinate system for the machine tool 2 and the robot coordinate system for the robot 3. Furthermore, according to the present embodiment, the numerical control device 5 and the robot control device 6 do not need to convert the coordinate values between the machine tool coordinate system and the robot coordinate system, whereby the computational load can be reduced accordingly. Consequently, deterioration of machining performance of the robot 3 and the machine tool 2 can be suppressed as well.

The coordinates-configuration information control unit 523 of the numerical control device 5 determines whether or not it is necessary to acquire reference coordinate values during execution of the numerical control program for robot. Upon determining that it is necessary to acquire the reference coordinate values, the coordinates-configuration information control unit 523 transmits a reference coordinate value request signal to the robot control device 6. In response to reception of the reference coordinate value request signal, the robot position management unit 65 of the robot control device 6 acquires the reference coordinate values, and transmits them to the numerical control device 5. This feature makes it possible to minimize communication between the numerical control device 5 and the robot control device 6, whereby the computational load can be reduced accordingly. Consequently, deterioration of the machining performance of the robot 3 and the machine tool 2 can be suppressed as well.

The coordinates-configuration information control unit 523 of the numerical control device 5 determines it necessary to acquire reference coordinate values when execution of the numerical control program for robot is started, and transmits a reference coordinate value request signal to the robot control device 6. Due to this feature, when control of the robot 3 based on the numerical control program for robot starts, the position and posture of the robot 3 at that time can be appropriately acquired by the numerical control device 5.

In the numerical control program for robot according to the present embodiment, the robot coordinate system can be switched between the joint coordinate format and the rectangular coordinate format that have different control axes. Furthermore, the coordinates-configuration information control unit 523 of the numerical control device 5 determines it necessary to acquire reference coordinate values at a timing when the designated coordinate format is set or switched in accordance with the numerical control program for robot, and then, transmits a reference coordinate value request signal to the robot control device 6. Due to this feature, at the timing when the designated coordinate format is set or switched, the numerical control device 5 can appropriately acquire the coordinate values in the designated coordinate format for the robot 3 at that time.

The present disclosure is not limited to the above embodiment, and various changes and modifications can be made to the present disclosure.

Explanation of Reference Numerals

1: Numerical Control System
2: Machine Tool
3: Robot
5: Numerical Control Device
51: Machine Tool Control Module
52: Robot Control Module
521: Program Input Unit
522: Input Analysis Unit
523: Coordinates-Configuration Information Control Unit
524: Coordinates-Configuration Information Management Unit
525: Robot Command Signal Generation Unit
526: Memory
526*a*: Coordinate Information Storage Area
526*b*: Configuration Information Storage Area
527: Coordinate Display Unit
528: Data Transmission/Reception Unit
53: Storage Unit
6: Robot Control Device
61: Data Transmission/Reception Unit
62: Input Analysis Unit
63: Robot Position Control Unit
64: Servo Control Unit
65: Robot Position Management Unit

The invention claimed is:
1. A numerical control system comprising:
a numerical control device configured to generate a machine tool command signal as a command directed to a machine tool in accordance with a first numerical control program described based on a first coordinate system, and a robot command signal as a command directed to a robot in accordance with a second numerical control program described based on a second coordinate system, the numerical control device inputting the machine tool command signal to the machine tool and causing the machine tool to machine a workpiece; and a robot control device communicable with the numerical control device and configured to control operation of the robot based on the robot command signal, wherein the first coordinate system is a machine tool coordinate system set on the machine tool, the second coordinate system is a robot coordinate system set on the robot, the robot control device acquires current coordinate values of the robot in the second coordinate system in response to reception of a predetermined request signal transmitted from the numerical control device, and transmits the coordinate values as reference coordinate values to the numerical control device, and the numerical control device transmits the request signal to the robot control device during execution of the second numerical control program, generates the robot command signal based on the reference coordinate values returned from the robot control device in response to the request signal and the second numerical control program, and transmits the robot control signal to the robot control device.

2. The numerical control system according to claim 1, wherein the numerical control device determines whether or not it is necessary to acquire the reference coordinate values during execution of the second numerical control program, upon determining that it is necessary to acquire the reference coordinate values, the numerical control device transmits the request signal to the robot control device.

3. The numerical control system according to claim 2, wherein the numerical control device determines it necessary to acquire the reference coordinate values when execution of the second numerical control program is started.

4. The numerical control system according to claim 2, wherein in the second numerical control program, the second coordinate system can be switched between two or more coordinate formats having different control axes, and the numerical control device determines it necessary to acquire the reference coordinate values at a timing when the coordinate format is set or switched in accordance with the second numerical control program.

* * * * *